(12) United States Patent
Lee (10) Patent No.: US 10,088,567 B2
(45) Date of Patent: Oct. 2, 2018

(54) ULTRASONIC SENSING DEVICE AND METHOD FOR VEHICLE

(71) Applicant: HYUNDAI MOBIS CO., LTD., Seoul (KR)

(72) Inventor: Jae Young Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 352 days.

(21) Appl. No.: 15/001,792

(22) Filed: Jan. 20, 2016

(65) Prior Publication Data
US 2016/0217686 A1    Jul. 28, 2016

(30) Foreign Application Priority Data
Jan. 27, 2015 (KR) .................. 10-2015-0012789

(51) Int. Cl.
| | |
|---|---|
| G01S 15/00 | (2006.01) |
| G01S 15/93 | (2006.01) |
| G01S 7/527 | (2006.01) |
| G08G 1/16 | (2006.01) |

(52) U.S. Cl.
CPC ............ *G01S 15/931* (2013.01); *G01S 7/527* (2013.01); *G08G 1/167* (2013.01); *G08G 1/168* (2013.01)

(58) Field of Classification Search
USPC .......................................... 367/87
See application file for complete search history.

(56) References Cited

U.S. PATENT DOCUMENTS

| | | | | |
|---|---|---|---|---|
| 5,549,111 | A * | 8/1996 | Wright .................. | G01S 15/895 600/443 |
| 5,600,675 | A * | 2/1997 | Engeler .................. | G01S 7/527 367/7 |
| 5,685,308 | A * | 11/1997 | Wright ................ | G01S 7/52023 600/443 |
| 5,827,188 | A * | 10/1998 | Wright ................ | G01S 7/52023 600/447 |
| 6,110,116 | A * | 8/2000 | Wright ................ | G01S 7/52023 600/447 |
| 6,135,961 | A * | 10/2000 | Pflugrath ................. | A61B 8/00 600/447 |
| 6,383,139 | B1 * | 5/2002 | Hwang .................... | A61B 8/00 600/441 |
| 6,416,475 | B1 * | 7/2002 | Hwang .................... | A61B 8/00 600/441 |
| 7,633,440 | B2 * | 12/2009 | Valio ....................... | G01S 19/24 342/357.57 |

(Continued)

*Primary Examiner* — James R Hulka
(74) *Attorney, Agent, or Firm* — NSIP Law (57) ABSTRACT

Provided are an ultrasonic sensing device and method for a vehicle, which may block ground noise and pass a signal reflected from an opponent vehicle traveling in a blind spot. The ultrasonic sensing device for the vehicle includes a band pass filter configured to filter a first input signal reflected by an object according to a predetermined first bandwidth to output a first filtering signal or filter a second input signal on which a 2N decimation operation has been performed according to a predetermined second bandwidth to output a second filtering signal, and a calculation unit configured to perform the 2N decimation operation on the first filtering signal output from the band pass filter and deliver the first filtering signal on which the 2N decimation operation has been performed to the band pass filter as the second input signal.

16 Claims, 6 Drawing Sheets

(56) References Cited

U.S. PATENT DOCUMENTS

| | | | | |
|---|---|---|---|---|
| 2002/0177774 A1* | 11/2002 | Hwang | ............. | A61B 8/00 |
| | | | | 600/441 |
| 2005/0138096 A1* | 6/2005 | Wintermantel | ....... | G01S 7/2927 |
| | | | | 708/300 |
| 2006/0036353 A1* | 2/2006 | Wintermantel | ......... | G01S 7/023 |
| | | | | 700/300 |
| 2007/0232910 A1* | 10/2007 | Hwang | ............. | A61B 8/00 |
| | | | | 600/437 |
| 2007/0279280 A1* | 12/2007 | Valio | ............. | G01S 19/24 |
| | | | | 342/357.63 |
| 2009/0196486 A1* | 8/2009 | Distante | ............. | G06T 7/0008 |
| | | | | 382/141 |

* cited by examiner

ULTRASONIC SENSING DEVICE AND METHOD FOR VEHICLE

CROSS-REFERENCE TO RELATED APPLICATIONS

This application claims priority under 35 U.S.C. § 119 to Korean Patent Application No. 10-2015-0012789, filed on Jan. 27, 2015, the disclosure of which is incorporated herein by reference in its entirety.

TECHNICAL FIELD

The present invention relates to an ultrasonic sensing device and method for a vehicle, and more particularly, to a device and method for blocking ground signals (noise) and passing a signal reflected from an opponent vehicle.

BACKGROUND

In general, vehicle ultrasonic sensors may be classified into an ultrasonic sensor for parking assistance, an ultrasonic sensor for automatic parking assistance, and an ultrasonic senor for blind spot detection according to the purpose of use.

An ultrasonic sensor for parking assistance operates when the velocity of a vehicle is equal to or less than 10 km/h, and an ultrasonic sensor for automatic parking assistance operates when the velocity of a vehicle is less than 35 km/h. The ultrasonic sensors are configured to sense static objects.

An ultrasonic senor for blind spot detection operates when the velocity of a vehicle is equal to or greater than 30 km/h, and is configured to sense dynamic objects, that is, opponent vehicles. That is, the ultrasonic senor for blind spot detection senses an opponent vehicle that travels in a blind spot and has a relative velocity of up to ±20 km/h.

The aforementioned ultrasonic sensor for parking assistance uses a band pass filter having a small bandwidth in order to be robust to acoustic noise because the frequency of a transmission signal is equal to the frequency of a reception signal that is reflected by an object to be sensed and received.

In addition, for the ultrasonic sensor for automatic parking assistance, although a vehicle may travel at up to 35 km/h, a moving line of the vehicle is perpendicular to a location of an object, and thus the frequency of a transmission signal is equal to the frequency of a reception signal.

That is, in general, since the ultrasonic sensor for parking assistance or the ultrasonic sensor for automatic parking assistance senses a static object, the frequency of the transmission signal is equal to the frequency of the reception signal. Accordingly, the ultrasonic sensor for parking assistance or the ultrasonic sensor for automatic parking assistance uses a band pass filter having a small bandwidth in order to be robust to external acoustic noise or electric noise. That is, since the bandwidth of the band pass filter is proportional to implementation complexity, a band pass filter having the smallest bandwidth within a given price range is chosen as a band pass filter of the ultrasonic sensor for parking assistance or the ultrasonic sensor for automatic parking assistance.

However, an ultrasonic senor for blind spot detection senses a dynamic object (e.g., an opponent vehicle) in a blind spot, and a relative velocity with respect to an opponent vehicle may be up to 20 km/h. Accordingly, due to the Doppler effect, the frequency of the transmission signal is not equal to the frequency of the reception signal.

Accordingly, when an ultrasonic senor for blind spot detection uses a band pass filter having a small bandwidth, such as that of the aforementioned acoustic sensor for parking assistance or acoustic sensor for auto-parking assistance, the filter may attenuate signals reflected by opponent vehicles as well as noise (e.g., ground signals).

When a band pass filter having a large bandwidth is used to solve the above problem, the ultrasonic sensor for blind spot detection may misrecognize signals (i.e., noise) reflected from the ground as an object sensed in a blind spot and provide a false alarm because the velocity of 30 km/h or greater causes the Doppler effect.

When an ultrasonic sensor is used to sense the rear to assist with parking rather than sensing a blind spot, the ultrasonic sensor may have a vertical beam angle that is set to be wide in order to sense speed humps. Accordingly, on a condition that the ultrasonic sensor having the wide vertical beam angle operates to sense a blind spot, when a ground signal is sensed from a remote location where magnitude of a signal of another vehicle decreases, it is difficult for the ultrasonic sensor to distinguish between the ground signal and the signal of the other vehicle.

SUMMARY

Accordingly, the present invention provides a ultrasonic sensing device and method for a vehicle, which may distinguish between a noise signal, etc. and a signal reflected from an opponent vehicle and accurately sense an opponent vehicle driving in a vehicle blind spot.

In one general aspect, an ultrasonic sensing device for a vehicle includes: a band pass filter configured to filter a first input signal reflected by an object according to a predetermined first bandwidth to output a first filtering signal or filter a second input signal on which a 2N decimation operation has been performed according to a predetermined second bandwidth to output a second filtering signal; and a calculation unit configured to perform the 2N decimation operation on the first filtering signal output from the band pass filter and deliver the first filtering signal on which the 2N decimation operation has been performed to the band pass filter as the second input signal.

The ultrasonic sensing device may further include a control unit configured to deliver a control signal for allowing the band pass filter to output the first filtering signal according to the first band width to the band pass filter when the first input signal is input to the band pass filter and deliver a control signal for allowing the band pass filter to output the second filtering signal according to the second bandwidth to the band pass filter when the second input signal is input from the calculation unit to the band pass filter.

The band pass filter may include: a switching unit configured to choose and output the first input signal and a first filter coefficient or the second input signal and a second filter coefficient according to the control signal; a delay unit configured to delay the first input signal and a first output signal corresponding to the first input signal according to the control signal and output the delayed first input signal and first output signal or delay the second input signal and a second output signal corresponding to the second input signal and output the delayed second input signal and second output signal; a multiplication operation unit configured to perform a multiplication operation between the signals output from the switching unit and the signals output from the delay unit and deliver result signals of the multiplication operation to an adder; and an addition operation unit configured to perform an addition operation on the result signals of the multiplication operation delivered from the adder and output a result signal of the addition operation.

The switching unit may include: a first multiplexer configured to output the first input signal when the control signal is a control signal for outputting the first filtering signal and output the second input signal when the control signal is a control signal for outputting the second filtering signal; and a plurality of multiplexers configured to output the first filter coefficient to the multiplication operation unit when the control signal is a control signal for outputting the first filtering signal and output the second filter coefficient to the multiplication operation unit when the control signal is a control signal for outputting the second filtering signal.

When the control signal for outputting the first filtering signal is input, the delay unit includes a second delay configured to delay an intermediate signal output from the first multiplexer and processed by $Z^{-1}$, deliver the intermediate signal delayed by $Z^{-1}$ to the multiplication operation unit and a fourth delay, further delay the delayed intermediate signal delivered from the fourth delay by $Z^{-1}$, and finally deliver the intermediate signal delayed by $Z^{-2}$ to the multiplication operation unit.

When the control signal for outputting the second filtering signal is input, the delay unit further includes a first delay configured to delay an intermediate signal output from the first multiplexer and processed by $Z^{-1}$, deliver the intermediate signal delayed by $Z^{-1}$ to the multiplication operation unit and a third delay, further delay the delayed intermediate signal delivered from the third delay by $Z^{-1}$, and finally deliver the intermediate signal delayed by $Z^{-2}$ to the multiplication operation unit.

The band pass filter may be a low-order infinite impulse response (IIR) band pass filter.

The calculation unit performs a 2N decimation operation on the first filtering signal having a frequency lower than fs/2 to shift the frequency of the first filtering signal to a frequency lower than the sampling frequency fs/4N and delivers the first filtering signal having a frequency shifted to a frequency lower than fs/4N to the band pass filter.

The first filtering signal on which the N decimation operation has been performed by the calculation unit has a greater digital signal bandwidth than the first filtering signal on which the 2 decimation operation has been performed by the calculation unit.

The band pass filter delivers the first filtering signal including a ground noise to the calculation unit and delivers the second filtering signal which the ground noise is removed to an envelope detector.

The band pass filter acquires the first filtering signal by using the first input signal and a first filter coefficient, and acquires the second filtering signal by using the second input signal and a second filter coefficient.

In another general aspect, a sensing method of an ultrasonic sensing device for a vehicle includes: when a signal reflected by an object is input as a first input signal, filtering the first input signal according to a predetermined first bandwidth to output a first filtering signal; performing a 2N decimation operation on the first filtering signal to output a second input signal; and filtering the second input signal on which the 2N decimation operation has been performed according to a predetermined second bandwidth to output a second filtering signal.

The outputting of the first filtering signal may include: choosing the first input signal corresponding to the first filtering signal and a first filter coefficient; delaying the chosen first input signal and a first output signal corresponding to the first input signal and outputting the delayed first input signal and first output signal; and performing a multiplication operation on the chosen first input signal and first filter coefficient and the delayed first input signal and first output signal, performing an addition operation on result signals of the multiplication operation, and outputting a result of the addition operation.

The outputting of the first output signal may include: delaying the chosen first input signal by $Z^{-1}$; further delaying the delayed first input signal by $Z^{-1}$ to finally output the first input signal delayed by $Z^{-2}$; delaying the first output signal corresponding to the chosen first input signal by $Z^{-1}$; and further delaying the delayed first output signal by $Z^{-1}$ to finally output the first output signal delayed by $Z^{-2}$.

The outputting of the second filtering signal may include: choosing the second input signal corresponding to the second filtering signal and a second filter coefficient; delaying the chosen second input signal and a second output signal corresponding to the second input signal and outputting the delayed second input signal and second output signal; and performing a multiplication operation on the chosen second input signal and second filter coefficient and the delayed second input signal and second output signal, performing an addition operation on result signals of the multiplication operation, and outputting a result of the addition operation.

The outputting of the second output signal may include: delaying the chosen second input signal by $Z^{-1}$; further delaying the delayed second input signal by $Z^{-1}$ to finally output the second input signal delayed by $Z^{-2}$; delaying the second output signal corresponding to the chosen second input signal by $Z^{-1}$; and further delaying the delayed second output signal by $Z^{-1}$ to finally output the second output signal delayed by $Z^{-2}$.

The outputting a second input signal comprises shifting the frequency of the first filtering signal to a frequency lower than the sampling frequency fs/4N by performing a 2N decimation operation on the first filtering signal having a frequency lower than fs/2; and outputting the first filtering signal having a frequency shifted to a frequency lower than fs/4N as the second input signal.

The performing a 2N decimation operation comprises performing a 2-decimation operation on the first filtering signal; and performing an N-decimation operation on the signal acquired by performing the 2-decimation operation.

Other features and aspects will be apparent from the following detailed description, the drawings, and the claims.

BRIEF DESCRIPTION OF THE DRAWINGS

FIGS. 2A-2E show an output signal of a band pass filter and calculation unit of FIG. 1.

DETAILED DESCRIPTION OF EMBODIMENTS

Hereinafter, embodiments of the present invention will be described in detail with reference to the accompanying drawings.

The above and/or other advantages, features and aspects of the present invention will become apparent from the following description of the embodiments with reference to the accompanying drawings, which is set forth hereinafter.

The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
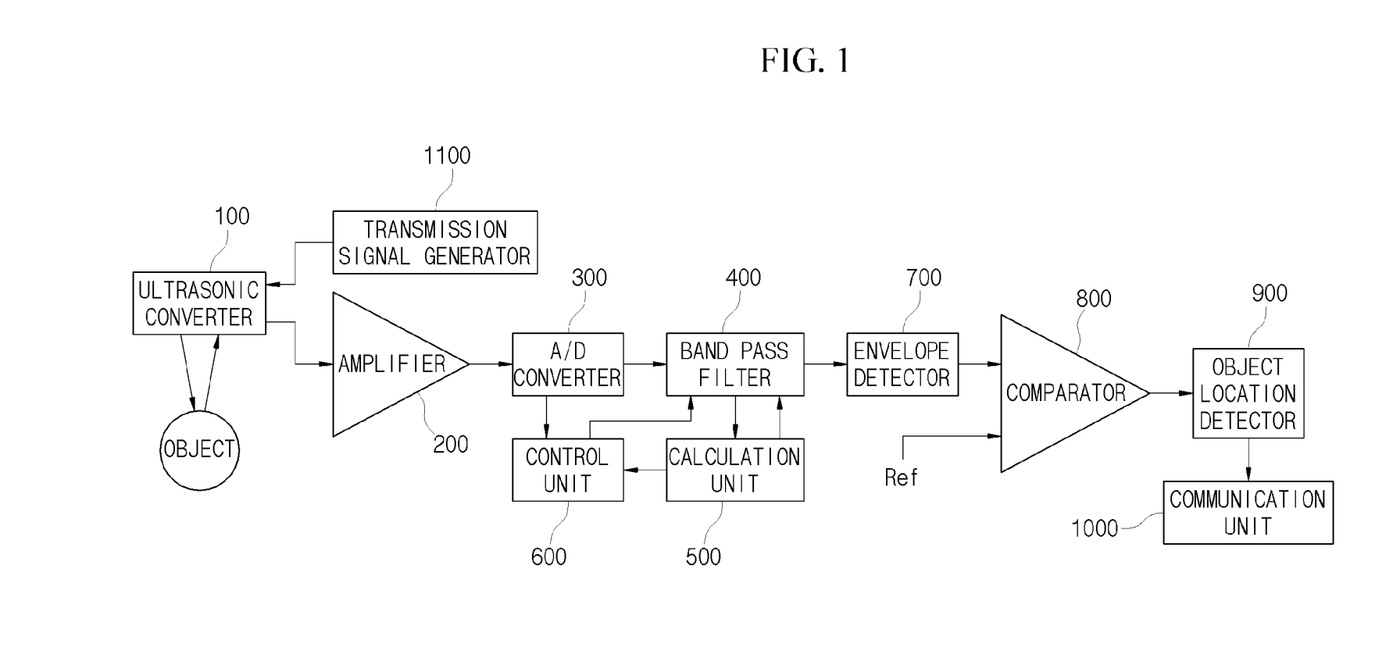
FIG. 1 is a block diagram showing an ultrasonic sensing device for a vehicle according to an embodiment of the present invention.

Hereinafter, an ultrasonic sensing device for a vehicle according to an embodiment of the present invention will be described with reference to FIGS. 1 to 4. FIG. 1 is a block diagram showing an ultrasonic sensing device for a vehicle according to an embodiment of the present invention.

As shown in FIG. 1, an ultrasonic sensing device for a vehicle according to an embodiment of the present invention includes a ultrasonic converter 100, an amplifier 200, an A/D converter 300, a bandwidth pass filter 400, a calculation unit 500, a control unit 600, an envelope detector 700, a comparator 800, an object position detector 900, a communication unit 1000, and a transmission signal generator 1100.

The ultrasonic converter 100 converts a transmission signal generated from the transmission signal generator 1100 into an ultrasonic signal.

The amplifier 200 receives an ultrasonic signal reflected by an object, amplifies the received ultrasonic signal by a predetermined gain, and delivers the amplified ultrasonic signal to the A/D converter 300.

The A/D converter 300 converts the ultrasonic signal delivered from the amplifier 200 into a digital signal and delivers the converted digital signal to the band pass filter 400.

The band pass filter 400 delivers a first filtering signal, which is obtained by filtering the digital signal delivered from the A/D converter 300 according to a predetermined first bandwidth, to the calculation unit 500 according to a first control signal.

For example, the band pass filter 400 is a low-order infinite impulse response (IIR) band pass filter, which delivers, to the calculation unit 500, a first filtering signal obtained by blocking a digital signal out of the predetermined first bandwidth and passing a digital signal within the predetermined first bandwidth among the digital signals delivered from the A/D converter 300.

The band pass filter 400 does not perfectly remove ground noise from the digital signal delivered from the A/D converter 300. Accordingly, the band pass filter 400 delivers the first filtering signal still including the ground noise to the calculation unit 500.

That is, the first filtering signal includes a signal reflected from an opponent vehicle and remaining ground noise other than the ground noise blocked by the first bandwidth. In addition, when a sampling frequency is fs, the frequency of the first filtering signal is approximate to a sampling frequency fs/2.

The calculation unit 500 performs a 2-decimation operation on the first filtering signal delivered from the band pass filter 400, changes the sampling frequency to fs/2 lower than fs, and shifts the frequency of the first filtering signal to a frequency lower than a sampling frequency fs/4.

Then, the calculation unit 500 performs an N-decimation operation on the first filtering signal having a frequency shifted to a frequency lower than the sampling frequency fs/4 and changes the sampling frequency to fs/2N lower than fs/2.

Finally, the calculation unit 500 performs a 2N decimation operation on the first filtering signal having a frequency lower than fs/2 to shift the frequency of the first filtering signal to a frequency lower than the sampling frequency fs/4N and delivers the first filtering signal having a frequency shifted to a frequency lower than fs/4N to the band pass filter 400.

The first filtering signal on which the N decimation operation has been performed by the calculation unit 500 has a greater digital signal bandwidth than the first filtering signal on which the 2 decimation operation has been performed by the calculation unit 500.

That is, by performing the 2N decimation operation, the calculation unit 500 serves to increase a digital signal bandwidth of the first filtering signal while shifting the sampling frequency of the first filtering signal to fs/2N.

The band pass filter 400 outputs a second filtering signal, which is obtained by blocking a signal out of a predetermined second bandwidth and passing only a signal within the predetermined second bandwidth among the first filtering signals transferred from the calculation unit 500 and having a frequency lower than the sampling frequency fs/2N, according to a second control signal.

For example, the band pass filter 400 delivers a second filtering signal obtained by perfectly blocking ground noise or the like according to the predetermined second bandwidth and passing only a signal reflected by an opponent vehicle to the envelope detector 700 among the first filtering signals having a frequency lower than the sampling frequency fs/2N.

When the signal reflected by the object is delivered to the band pass filter 400 as an input signal through the amplifier 200 and the A/D/converter 300, the control unit 600 delivers a first control signal to the band pass filter 400.

In addition, when a signal on which an 2N decimation operation has been performed is delivered from the calculation unit 500 to the band pass filter 400, the control unit 600 delivers a second control signal to the band pass filter 400.

The envelope detector 700 detects only a signal corresponding to a predetermined frequency band among the second filtering signals delivered from the band pass filter 400 and delivers the detected signal to the comparator 800.

The comparator 800 compares the magnitude of the signal delivered from the envelope detector 700 with a predetermined threshold value, choose only a signal greater than or equal to the threshold value, only a signal less than the threshold value, or only a signal equal to the threshold value according to a result of the comparison, and delivers the chosen signal to the object location detector 900.

The object location detector 900 detects the location of the object using an ultrasonic signal delivered from the comparator 800 and delivers the detected object location information to the communication unit 1000.

The communication unit 1000 transmits the object location information delivered from the object location detector 900 to a blind spot sensing system. The blind spot sensing system uses the objected location information to recognize a vehicle traveling in a blind spot, etc.

An output signal of the above-described band pass filter 400 and calculation unit 500 will be described in more detail below with reference to FIG. 2. FIG. 2 is a view showing the output signal of the band pass filter and calculation unit of FIG. 1.

The signal delivered from the A/D converter 300 includes the signal reflected by the opponent vehicle and the ground noise. The frequency of the signal delivered from the A/D converter 300 is fc, the sampling frequency is fs, and the bandwidth of the signal reflected by the opponent vehicle is w. When the frequency fc of the signal delivered from the A/D converter 300 is positioned approximate to fs/2 (between fs/4 and fs/2), the signal delivered from the A/D converter 300 may be represented as shown in FIG. 2A.

Figure 2A:
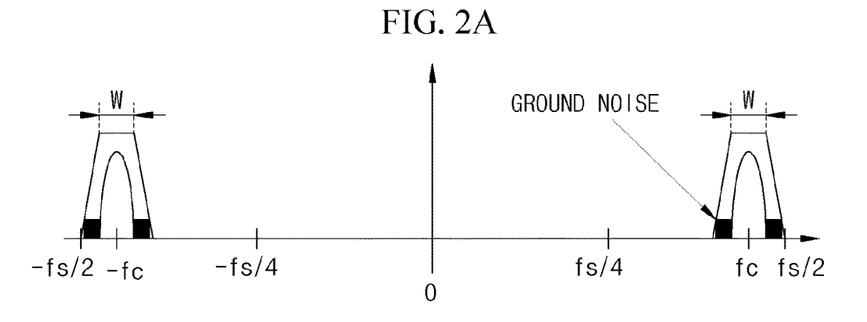
FIG. 2A shows when the frequency fc of the signal delivered from the A/D converter 300 is positioned approximate to fs/2 (between fs/4 and fs/2), the signal delivered from the A/D converter 300.

For example, FIG. 2A shows the signal delivered from the A/D converter 300 in a frequency region (+) and a frequency region (−). Since the standard frequency is fs, the digital frequency is represented as +(fs/2) and −(fs/2). In addition, FIG. 2A shows that the frequency +(fc) of the signal delivered from the A/D converter 300 is positioned approximate to +(fs/2) and −(fc) of the signal delivered from the A/D converter 300 is positioned approximate to −(fs/2).

When the signal such as that shown in FIG. 2A is received from the A/D converter 300 according to the first control signal, the band pass filter 400 outputs the first filtering signal obtained by passing the signal received from the A/D converter 300 according to the predetermined first bandwidth.

In this case, the complexity of the band pass filter 400 may be represented as shown in Equation (1):

$$\frac{f_s}{\alpha} \quad (1)$$

where fs is a sampling frequency, and α is a difference in frequency between a ground noise when a vehicle travels at a first velocity and a signal reflected by an opponent vehicle when a relative velocity is a second velocity.

Figure 2B:
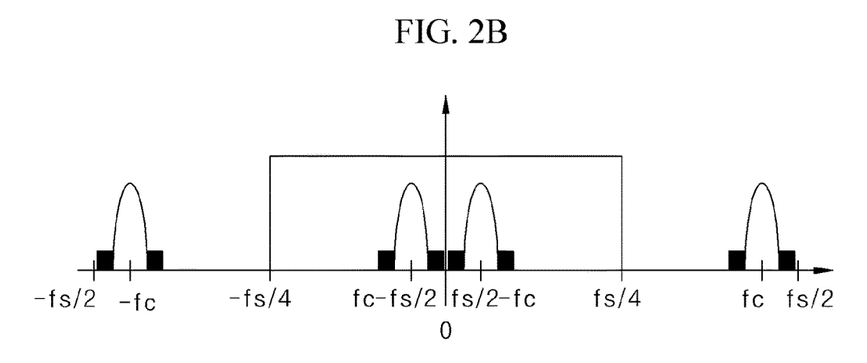
FIG. 2B shows a signal in a process of performing a 2-decimation operation on the first filtering signal output by the band pass filter 400.

The calculation unit 500 may represent a signal in a process of performing a 2-decimation operation on the first filtering signal output by the band pass filter 400, as shown in FIG. 2B.

For example, the calculation unit 500 performs a 2 decimation operation on the first filter signal to change the sampling frequency fs to fs/2 and matches the frequency fc of the first filtering signal to the changed sampling frequency fs/2 to shift the matched frequency to fs/2-fc.

Figure 2C:
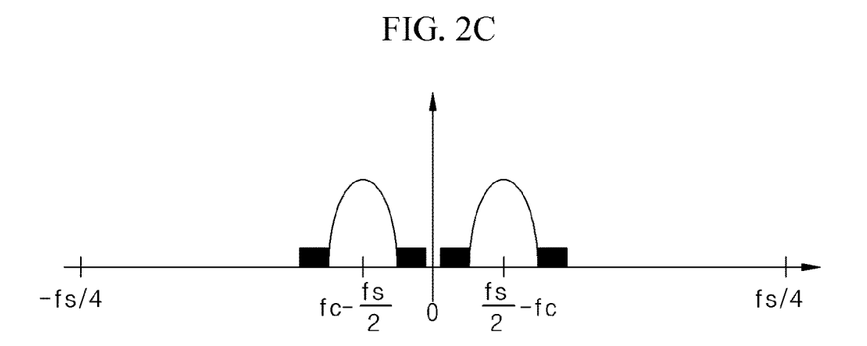
FIG. 2C shows that the calculation unit 500 may perform a 2-decimation operation on the first filtering signal obtained by outputting the signal, such as that shown in FIG. 2A, which is delivered from the A/D converter 300 through the band pass filter 400 and thus may finally acquire a signal.

That is, the calculation unit 500 may perform a 2-decimation operation on the first filtering signal obtained by outputting the signal, such as that shown in FIG. 2A, which is delivered from the A/D converter 300 through the band pass filter 400 and thus may finally acquire a signal such as that shown in FIG. 2C.

The calculation unit 500 may perform an N-decimation operation on the signal, such as that shown in FIG. 2C, which is acquired by performing the 2-decimation operation, in order to satisfy Equation (2) below and may output a signal, such as that shown in FIG. 2D, which has the frequency fs/2-fc lower than fs/N.

$$\frac{f_s}{2} - f_c + \frac{w}{2} + \alpha \leq \frac{f_s}{4N} \quad (2)$$

where fc is a frequency of a first filtering signal output by the band pass filter 400, fs is a sampling frequency, N is a decimation order, and α: a difference in frequency between a ground noise when a vehicle travels at a first velocity and a signal reflected by an opponent vehicle when a relative velocity is a second velocity.

Figure 2D:
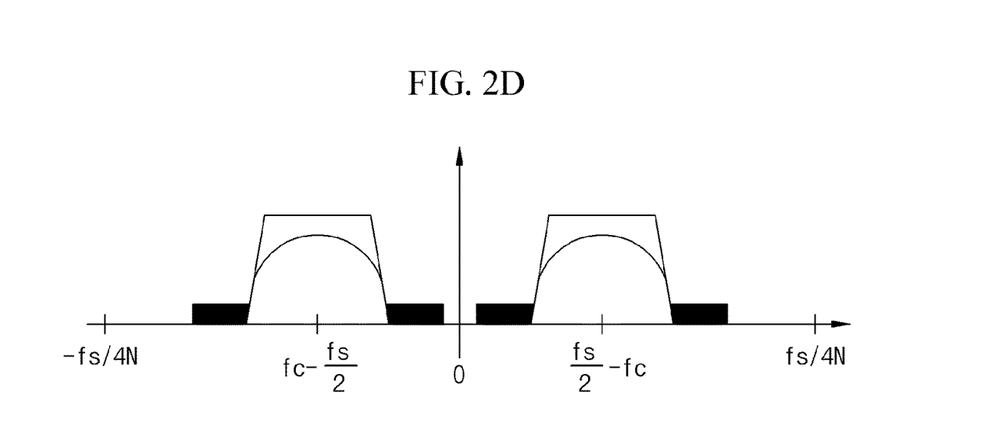
FIG. 2D shows a second filtering signal obtained by perfectly blocking the ground noise according to the predetermined second bandwidth and passing only a signal reflected by the opponent vehicle among the signals.

The band pass filter 400 outputs a second filtering signal obtained by perfectly blocking the ground noise according to the predetermined second bandwidth and passing only a signal reflected by the opponent vehicle among the signals, such as that shown in FIG. 2D, which are output by the calculation unit 500, according to the second control signal.

Figure 2E:
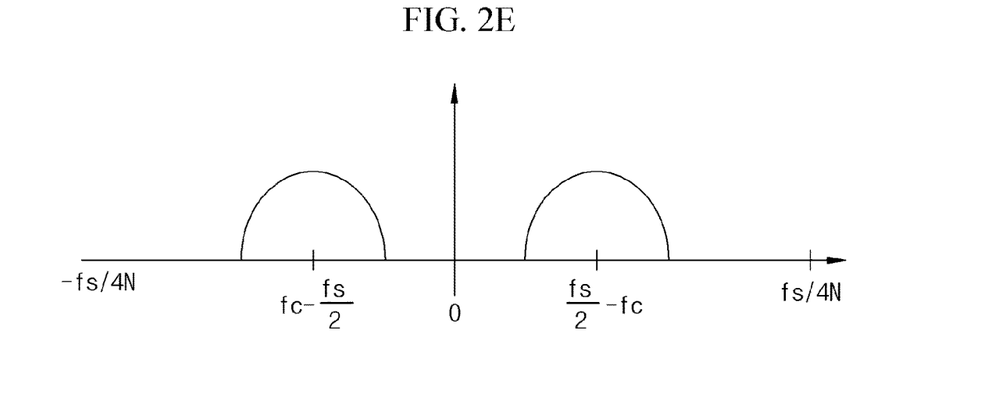
FIG. 2E shows the second filtering signal obtained by passing only the signal.

That is, the band pass filter 400 delivers, to the envelope detector 700, the second filtering signal obtained by passing only the signal, such as that shown in FIG. 2E, which is reflected from the opponent vehicle among the signals, such as that shown in FIG. 2D, which are output by the calculation unit 500.

Figure 3:
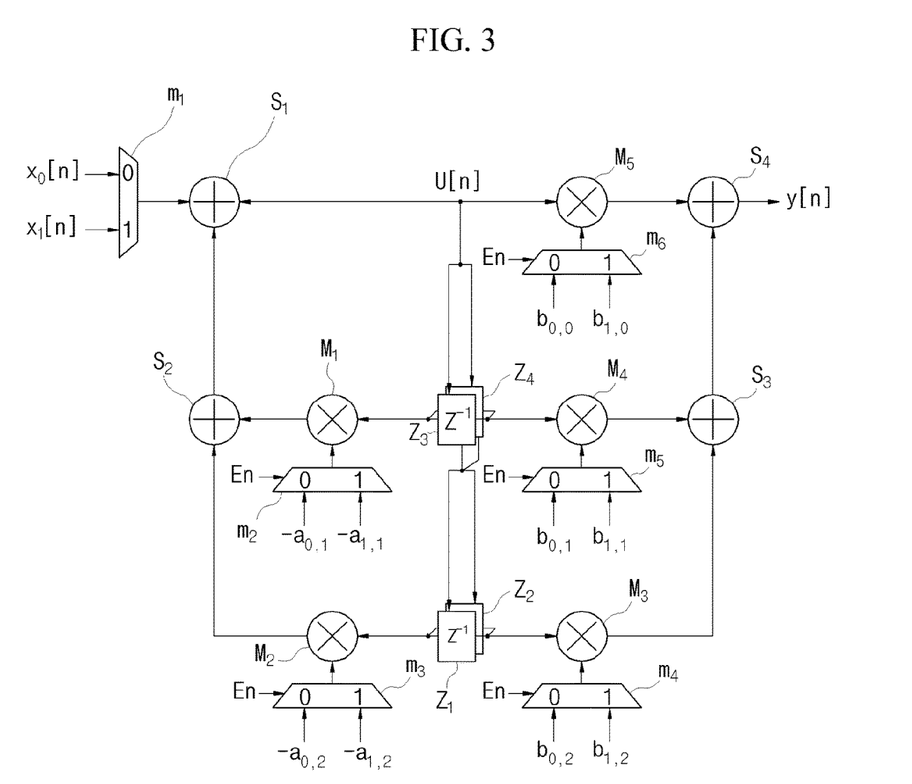
FIG. 3 is a view showing a structure of a band pass filter of FIG. 1.
Figure 4:
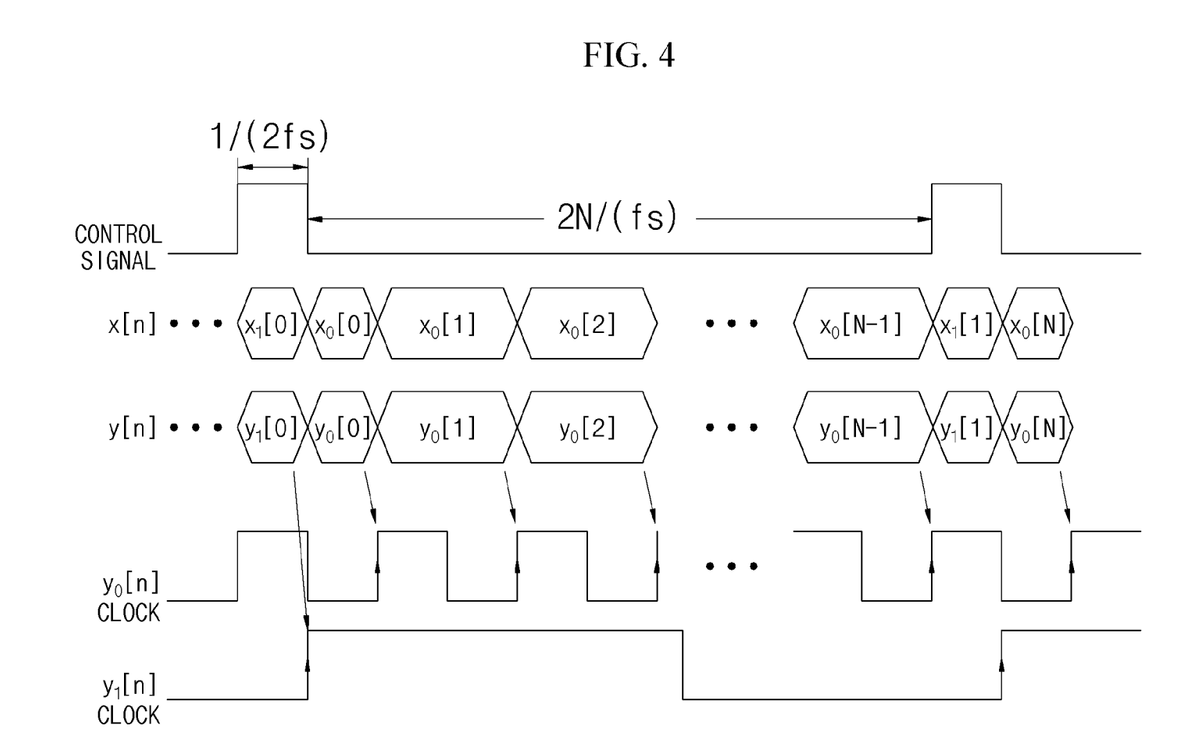
FIG. 4 is a view showing input/output operations of a band pass filter of FIG. 1.

A structure and an operation of the band pass filter 400 will be described in detail below with reference to FIGS. 3 and 4. FIG. 3 is a view showing the structure of the band pass filter of FIG. 1, and FIG. 4 is a view showing the operation of the band pass filter of FIG. 1.

As shown in FIG. 3, the band pass filter 400 includes five multipliers M1, M2, M3, M4, and M5, four adders S1, S2, S3, and S4, four delays Z1, Z2, Z3, and Z4, and six multiplexers m1, m2, m3, m4, m5, and m6.

When a first control signal, that is, an enable bar (0) signal is input through an enable (En) line, the five multipliers M1, M2, M3, M4, and M5, the four adders S1, S2, S3, and S4, the four delays Z1, Z2, Z3, and Z4, and the six multiplexers m1, m2, m3, m4, m5, and m6 output values corresponding to a first filtering signal.

For example, the first multiplexer m1 outputs a current input signal $X_0[n]$ of the band pass filter 400. The second multiplexer m2, the third multiplexer m3, the fourth multiplexer m4, the fifth multiplexer m5, and the sixth multiplexer m6 output first filter coefficients $-a_{0,1}$, $-a_{0,2}$, $b_{0,0}$, $b_{0,1}$, and $b_{0,2}$ of the band pass filter 400.

The fourth delay Z4 delays a current intermediate signal $U[n]$ output from the first multiplexer m1 by $Z^{-1}$ to generate $U[n]Z^{-1}$ and delivers the generated $U[n]Z^{-1}$ to the first multiplexer M1, the fourth multiplexer M4, and the second delay Z2.

The second delay Z2 delays the $U[n]Z^{-1}$ delivered from the fourth delay Z4 by $Z^{-1}$ to generate $U[n]Z^{-2}$ and delivers the generated $U[n]Z^{-2}$ to the second multiplexer M2 and the third multiplexer M3.

The first multiplexer M1 performs a multiplication operation between the $y[n]Z^{-1}$ delivered from the fourth delay Z4 and $-a_{0,1}$ delivered from the second multiplexer m2 and delivers a result of the multiplication operation to the second adder S2.

The second multiplexer M2 performs a multiplication operation between the $U[n]Z^{-2}$ delivered from the second delay Z2 and $-a_{0,2}$ delivered from the third multiplexer m3 and delivers a result of the multiplication operation to the second adder S2.

The third multiplexer M3 performs a multiplication operation between the $U[n]Z^{-2}$ delivered from the second delay Z2 and $b_{0,2}$ delivered from the fourth multiplexer m4 and delivers a result of the multiplication operation to the third adder S3.

The fourth multiplexer M4 performs a multiplication operation between the $U[n]Z^{-1}$ delivered from the fourth delay Z4 and $b_{0,1}$ delivered from the fifth multiplexer m5 and delivers a result of the multiplication operation to the third adder S3.

The fifth multiplexer M5 performs a multiplication operation between the U[n] delivered from the first multiplexer m1 and $b_{0,0}$ delivered from the sixth multiplexer m6 and delivers a result of the multiplication operation to the fourth adder S4.

The first adder S1 performs an addition operation between y[n] and an output $-a_{0,1}U[n]Z^{-1}+-a_{0,2}U[n]Z^{-2}$ of the second adder S2 and outputs $U[n]=X_0[n]-a_{0,1}U[n]Z^{-1}+-a_{0,2}U[n]Z^{-2}$, which is a result of the addition operation.

That is, the output result U[n] of the first adder S1 is $X_0[n]/(1+a_{0,1}Z^{-1}+a_{0,2}Z^{-2})$.

The third adder S3 performs an addition operation between an output the $b_{0,2}U[n]Z^{-2}$ of the third multiplexer M3 and an output $b_{0,1}U[n]Z^{-1}$ of the fourth multiplexer, and delivers a result of the addition operation to the four adder S4.

The fourth adder S4 performs an addition operation between an output $b_{0,2}U[n]Z^{-2}+b_{0,1}U[n]Z^{-1}$ of the third adder S3 and $b_{0,0}U[n]$ and outputs $b_{0,0}U[n]+b_{0,1}U[n]Z^{-1}+b_{0,2}U[n]Z^{-2}$, which is a result of the addition operation.

That is, the fourth adder S4 outputs $U[n](b_{0,0}+b_{0,1}Z^{-1}+b_{0,2}Z^{-2})$.

Since an output U[n] of the first adder S1 is $X_0[n]/((1+a_{0,1}Z^{-1}+a_{0,2}Z^{-2})$, an output y[n] of the fourth adder S4 may be represented as $X_0[n](b_{0,0}+b_{0,1}Z^{-1}+b_{0,2}Z^{-2})/(1+a_{0,1}Z^{-1}+a_{0,2}Z^{-2})$.

When a second control signal, that is, an enable (1) signal is input through an enable (En) line, the five multipliers M1, M2, M3, M4, and M5, the four adders S1, S2, S3, and S4, the four delays Z1, Z2, Z3, and Z4, and the six multiplexers m1, m2, m3, m4, m5, and m6 output values corresponding to a second filtering signal. Since the operation is the same as the operation of outputting values corresponding to the above-described filtering signal, a detailed description thereof will not be provided.

As described above, the band pass filter 400 uses a time division method in order to serve as two band pass filters using the five multipliers M1, M2, M3, M4, and M5 and the four adders S1, S2, S3, and S4 in common.

That is, in order to use two directional inputs $X_0[n]$ and $X_1[n]$ and different coefficients $-a_{0,1}$, $-a_{0,2}$, $b_{0,0}$, $b_{0,1}$, $b_{0,2}$, $-a_{1,1}$, $-a_{1,2}$, $b_{1,0}$, $b_{1,1}$, and $b_{1,2}$ to acquire outputs $Y_0[n]$ and $Y_1[n]$ corresponding to the two directional inputs $X_0[n]$ and $X_1[n]$, the band pass filter 400 may add the six multiplexers m1, m2, m3, m4, m5, and m6 and the four delays Z1, Z2, Z3, and Z4 to a conventional IIR filter and use an enable signal/enable bar signal for switching the six multiplexers m1, m2, m3, m4, m5, and m6 to control signal flow.

The above-description will be made in more detail through an equation.

A general IIR filter may represent a current output of the filter as the sum of previous results and current and previous inputs, as shown in Equation (3):

$$y(n) = \sum_{j=0}^{\infty} h(j)x(n-j) = \sum_{i=1}^{N} a_i y(n-i) + \sum_{j=0}^{M} b_j x(n-j) \quad (3)$$

where y[n] indicates a current output of a general IIR filter, h(j) indicates an impulse response of the general IIR filter, x[n−j] indicates current and previous inputs of the general IIR filter, and y(n−i) indicates previous outputs of the general IIR filter. When $\{1, a_1, \ldots, a_N\}$ and $\{b_0, b_1, \ldots, b_M\}$ are assumed as A and B, respectively, A and B are coefficients of the IIR filter.

For example, when N=2 and M=2, Equation (3) may be represented as $y[n] \pm a_1 y[n-1] \pm a_2 y[n-2] = b_0 x[n] + b_1 x[n-1] + b_2 x[n-2]$.

When y[n−1], y[n−2] and x[n−1], x[n−2] are z-transformed, y[n−1], y[n−2] and x[n−1], x[n−2] may be represented as $y[n]=Y(Z)$, $y[n-1]=Y(Z)Z^{-1}$, $y[n-2]=Y(Z)Z^{-2}$, $x[n]=X(Z)$, $x[n-1]=X(Z)[n]Z^{-1}$, $x[n-2]=X(Z)Z^{-2}$.

Accordingly, when N=2 and M=2, Equation (3) may be represented as $Y(Z)(1 \pm a_1 Z^{-1} \pm a_2 Z^{-2}) = X(Z)(b_0 + b_1 Z^{-1} + b_2 Z^{-2})$.

When the above-described equation is represented as a transfer function H(Z) of a general IIR filter, the equation is expressed as Equation (4):

$$\frac{Y(Z)}{X(Z)} = H(Z) = \frac{(b_{0,0} + b_{0,1} Z^{-1} + b_{0,2} Z^{-2})}{(1 + a_{0,1} Z^{-1} + a_{0,2} Z^{-2})} \quad (4)$$

When $\{1, a_1, \ldots, a_N\}$=A and $\{b_0, b_1, \ldots, b_M\}$=B, A and B are coefficients of the IIR filter.

From Equation (4), the structure of the band pass filter 400 may be represented as Equation (5) and Equation (6):

$$Y_0(Z) = \frac{(b_{0,0} + b_{0,1} Z^{-1} + b_{0,2} Z^{-2})}{(1 + a_{0,1} Z^{-1} + a_{0,2} Z^{-2})} X_0(Z) \quad (5)$$

where $Y_0(Z)$ is an output signal of the band pass filter 400 according to the first control signal, $X_0(Z)$ is an input signal of the band pass filter 400 according to the first control signal, $a_{0,1}$, $a_{0,2}$, $b_{0,0}$, $b_{0,1}$, and $b_{0,2}$ are coefficients of the band pass filter 400 according to the first control signal, and n=0, ..., N; and $$Y_1(Z) = \frac{(b_{1,0} + b_{1,1} Z^{-1} + b_{1,2} Z^{-2})}{(1 + a_{1,1} Z^{-1} + a_{1,2} Z^{-2})} X_1(Z) \quad (6)$$

where $Y_1(Z)$ is an output signal of the band pass filter 400 according to the second control signal, $X_1(Z)$ is an input signal of the band pass filter 400 according to the second control signal, $a_{1,1}$, $a_{1,2}$, $b_{0,1}$, $b_{1,1}$, and $b_{1,2}$ are coefficients of the band pass filter 400 according to the second control signal, and n=0, . . . , N.

As shown in FIG. 4, the band pass filter 400 receives $X_0[n]$ from the A/D converter 300 and outputs $Y_0[n]$ according to the first control signal, and receives $X_1[n]$ from the calculation unit 500 and outputs $Y_1[n]$ to the envelope detector 700 according to the second control signal.

For example, the control signal input through the enable line En is converted from the enable bar signal (0) to an enable signal (1) every 2N/fs. That is, the enable signal (1) is input as a control signal through the enable line En during 1/2fs, and the enable bar signal (0) is input during 2N/fs. In summary, the control signal input through the enable line En is converted to an enable signal (1) every 2N/fs.

Additionally, the band pass filter 400 has an operating velocity according to the first control signal and an operating velocity according to the second control signal, which are different from each other. Accordingly, while the control signal input through the enable line En is the first control signal, that is, the enable bar signal (0), the band pass filter 400 receives $X_0[n]$ from the A/D converter 300, and outputs $Y_0[n]$ whenever $Y_0[n]$ clock becomes high (=1).

While a second control signal, that is, the enable signal (1) is input through the enable line (En), the band pass filter 400 receives $X_1[n]$ from the calculation unit 500 and outputs $Y_1[n]$ to the envelope detector 700 whenever $Y_1[n]$ clock becomes high (=1).

As described above, since the band pass filter 400 has the operating velocity according to the first control signal and the operating velocity according to the second control signal, which are different from each other, the six multiplexers m1, m2, m3, m4, m5, and m6 switch output values depending on whether a control signal input through the enable line (En) is the enable signal (1) or the enable bar signal (0) and allow the five multiplexers M1, M2, M3, M4, and M5 and the four adders S1, S2, S3, and S4 to be used in common in a time division method in which the four delays Z1, Z2, Z3, and Z4 are chosen, thus reducing the production cost.

A part having a low complexity in the band pass filter 400 of the ultrasonic sensing device for the vehicle according to an embodiment of the present invention will be described below in more detail, compared with a conventional high-order band pass filter.

For example, when a difference in frequency between the ground noise when the vehicle travels at 30 km/h and the signal reflected from the opponent vehicle when the relative velocity is 20 km/h is α, and the ground noise and the signal reflected from the opponent vehicle are distinguished using a conventional high-order band pass filter, the complexity of the conventional high-order band pass filter may be represented as fs/α.

However, when the calculation unit 500 performs N-decimation to output a signal such as that shown in FIG. 2D, the complexity of the band pass filter 400 that divides the signal such as that shown in FIG. 2D into the ground noise and the signal reflected from the opponent vehicle may be represented as fs/(2Nα). It can be seen that the complexity of the ultrasonic sensing device for the vehicle according to an embodiment of the present invention decreases by a factor of 2N, compared with the complexity of the conventional high-order band pass filter.

For example, when the sampling frequency is determined to satisfy Equation (7) below, and the complexity of the band pass filter 400 is equal to or less than fs/(2Nα), the ultrasonic sensing device for the vehicle according to an embodiment of the present invention may have the same performance as the conventional high-order band pass filter.

$$\frac{fs}{2} - fc - \frac{w}{2} - \alpha \geq 0 \qquad (7)$$

where fc is a frequency of a signal of the band pass filter 400, fs is a sampling frequency, and a is a difference in frequency between a ground noise when a vehicle travels at a first velocity and a signal reflected by an opponent vehicle when a relative velocity is a second velocity)

Accordingly, the complexity of the band pass filter 400 decreases by a factor of 1/2N, compared with the complexity of the conventional high-order band pass filter.

As described above, in order to maximally decrease the complexity of the band pass filter 400, compared with the complexity of the conventional high-order band pass filter, N should have a maximum value.

In the general ultrasonic sensor, fc, w, and α are constants according to characteristics of the sensor. According to Equation (7), the range of fs may be represented as in Equation (8):

$$f_c + \frac{w}{2} + \alpha \leq \frac{2N}{2N-1}\left(f_c - \frac{w}{2} - \alpha\right) \qquad (8)$$

where fc is a frequency of an ultrasonic sensor signal, fs is a sampling frequency, w is a bandwidth of an ultrasonic sensor signal, α is a difference in frequency between a ground noise when a vehicle travels at a first velocity and a signal reflected by an opponent vehicle when a relative velocity is a second velocity, and N: a decimation order.

For example, when fc is 48 kHz, w is 3 kHz, and α is 0.74 kHz, the ultrasonic sensing device for the vehicle according to an embodiment of the present invention allows up to 10-decimation and thus may distinguish between the ground noise and the signal reflected from the opponent vehicle using the complexity of 1/10. In this case, the sampling frequency fs is a value in the range of 100.48 kHz and 167.1972 kHz.

Figure 5:
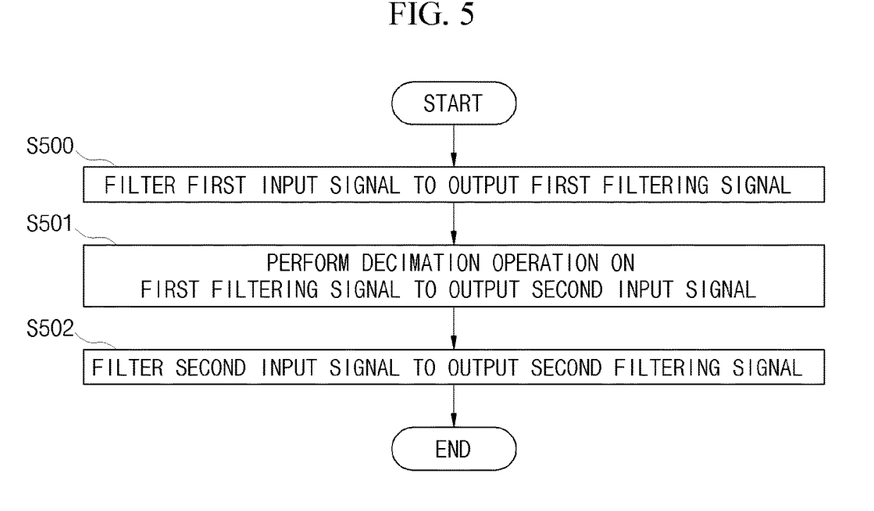
FIG. 5 is a flowchart showing a sensing method of an ultrasonic sensing device for a vehicle according to an embodiment of the present invention.

A sensing method of an ultrasonic sensing device for a vehicle according to an embodiment of the present invention will be described below with reference to FIG. 5. FIG. 5 is a flowchart showing a sensing method of an ultrasonic sensing device for a vehicle according to an embodiment of the present invention.

As shown in FIG. 5, in step S500, the sensing method of the ultrasonic sensing device for the vehicle according to an embodiment of the present invention includes filtering a first input signal and outputting a first filtering signal.

For example, when a signal reflected from an object is input as the first input signal, the first input signal is filtered according to a predetermined first bandwidth and then output as the first filtering signal.

In step S501, the method includes performing a decimation operation on the output first filtering signal to output a second input signal.

For example, the method includes performing a 2-decimation operation on the output first filtering signal, changing the sampling frequency to fs/2 lower than fs, and shifting the frequency of the first filtering signal to a frequency lower than the sampling frequency fs/4.

Then, the method includes performing an N-decimation operation on the first filtering signal having a frequency shifted to a frequency lower than the sampling frequency fs/4 and changing the sampling frequency to fs/2N.

As a result, the method includes performing an N-decimation operation on the first filtering signal having a frequency lower than fs/4 after 2-decimation to change a digital signal of the first filtering signal to a frequency lower than fs/4N and then output the changed first filtering signal as a second input signal.

In step S502, the method includes filtering the output second input signal to output a second filtering signal.

That is, the method include outputting the second filtering signal, which is obtained by blocking a signal out of a predetermined second bandwidth and passing only a signal within the predetermined second bandwidth among the output second input signals having a frequency lower than fs/4N.

For example, the second filtering signal, which is obtained by perfectly blocking a ground noise or the like according to a predetermined second bandwidth and passing only a signal reflected by an opponent vehicle, is output among the second input signals having a frequency lower than fs/4N.

The envelope detector detects only a signal corresponding to a predetermined frequency band among the output second filtering signals and delivers the detected signal to the comparator.

The comparator compares the magnitude of the signal delivered from the envelope detector with a predetermined threshold value, choose only a signal greater than or equal to the threshold value, only a signal less than the threshold value, or only a signal equal to the threshold value according to a result of the comparison, and delivers the chosen signal to the object location detector.

The object location detector detects the location of the object using an ultrasonic signal delivered from the comparator and delivers the detected object location information to the communication unit.

The communication unit transmits the object location information delivered from the object location detector to a blind spot sensing system. The blind spot sensing system uses the object location information to recognize a vehicle traveling in a blind spot, etc.

According to an embodiment of the present invention, it is possible to distinguish between a signal reflected from the ground when the vehicle travels at a first velocity or higher and a signal reflected from an opponent vehicle when a relative velocity with respect to the opponent vehicle travelling in a vehicle blind spot is equal to or less than a second velocity.

That is, it is possible to implement a two-stage band pass filter having the same performance as a conventional one-stage high-order band pass filter by blocking the signal reflected by the ground when the vehicle traveling velocity is higher than or equal to the first velocity and passing the signal reflected by the opponent vehicle when the relative velocity with respect to the opponent vehicle is lower than or equal to the second velocity.

In particular, it is also possible to reduce the implementation complexity by implementing a two-stage low-order band pass filter instead of the conventional one-stage high-order band pass filter having the high implementation complexity.

It should be understood that although the present invention has been described above in detail with reference to the accompanying drawings and exemplary embodiments, this is illustrative only and various modifications may be made without departing from the spirit or scope of the invention. Thus, the scope of the present invention is to be determined by the following claims and their equivalents, and shall not be restricted or limited by the foregoing detailed description.

What is claimed is:

1. An ultrasonic sensing device for a vehicle, the ultrasonic sensing device comprising:
    a band pass filter configured to:
        filter a first input signal, as an ultrasonic reflection of a vehicular object, according to a predetermined first bandwidth to output a first filtering signal; and
        filter a second input signal according to a predetermined second bandwidth to output a second filtering signal; and
    a calculation unit configured to:
        perform a 2N decimation operation on the first filtering signal, output from the band pass filter, to generate the second input signal, N being a decimation order; and
        provide the second input signal to the band pass filter for the outputting of the second filtering signal by the band pass filter.

2. The ultrasonic sensing device of claim 1, further comprising a control unit configured to provide, to the band pass filter, a first control signal for controlling the band pass filter to output the first filtering signal according to the first band width when the first input signal is input to the band pass filter and provide a second control signal, to the band pass filter, for controlling the band pass filter to output the second filtering signal according to the second bandwidth when the second input signal is provided from the calculation unit to the band pass filter.

3. The ultrasonic sensing device of claim 2, wherein the band pass filter comprises:
    a switching unit configured to choose, according to whether a received control signal is the first control signal or the second control signal, to output the first input signal and a first filter coefficient or to output the second input signal and a second filter coefficient;
    a delay unit configured to delay the first input signal and a first output signal corresponding to the first input signal according to the received control signal being the first control signal and output the delayed first input signal and the delayed first output signal, or to delay the second input signal and a second output signal corresponding to the second input signal according to the received control signal being the second control signal and output the delayed second input signal and the delayed second output signal;
    a multiplication operation unit configured to perform a multiplication operation between signals output from the switching unit and signals output from the delay unit and deliver resultant signals of the multiplication operation to an adder; and
    an addition operation unit configured to perform an addition operation on resultant signals of the multiplication operation delivered from the adder and to output a result signal of the addition operation.

4. The ultrasonic sensing device of claim 3, wherein the switching unit comprises:
    a first multiplexer configured to output the first input signal when the received control signal is the first control signal and to output the second input signal when the received control signal is the second control signal; and
    a plurality of multiplexers configured to output the first filter coefficient to the multiplication operation unit when the received control signal is the first control signal and to output the second filter coefficient to the multiplication operation unit when the control signal is the second control signal.

5. The ultrasonic sensing device of claim 1, wherein the band pass filter is a low-order infinite impulse response (IIR) band pass filter.

6. The ultrasonic sensing device of claim 1, wherein the calculation unit performs the 2N decimation operation on the first filtering signal having a frequency lower than fs/2, fs being a sampling frequency, to shift the frequency of the first filtering signal to a frequency lower than a frequency fs/4N and delivers the first filtering signal having a frequency shifted to a frequency lower than the frequency fs/4N to the band pass filter.

7. The ultrasonic sensing device of claim 1, wherein the first filtering signal has a lesser digital signal bandwidth than a signal resulting from an N decimation of the first filtering signal.

8. The ultrasonic sensing device of claim 1, wherein the band pass filter delivers the first filtering signal including a ground noise to the calculation unit and delivers the second filtering signal, having the ground noise removed, to an envelope detector.

9. The ultrasonic sensing device of claim 1, wherein the band pass filter acquires the first filtering signal by using the first input signal and a first filter coefficient, and acquires the second filtering signal by using the second input signal and a second filter coefficient.

10. A sensing method of an ultrasonic sensing device for a vehicle, the sensing method comprising:
band pass filtering, using a band pass filter, a first input signal according to a predetermined first bandwidth to output a first filtering signal, the first input signal being an ultrasonic reflection of a vehicular object;
performing a 2N decimation operation on the first filtering signal to output a second input signal, N being a decimation order;
providing the second input signal to the band pass filter; and
band pass filtering, using the band pass filter, the second input signal according to a predetermined second bandwidth to output a second filtering signal.

11. The sensing method of claim 10, wherein the outputting of the first filtering signal comprises:
choosing, between available input signals, the first input signal corresponding to the first filtering signal and a first filter coefficient;
delaying the chosen first input signal and a first output signal corresponding to the first input signal and outputting the delayed first input signal and the delayed first output signal; and
performing a multiplication operation on the chosen first input signal and the first filter coefficient and the delayed first input signal and the delayed first output signal, performing an addition operation on resultant signals of the multiplication operation, and outputting a result of the addition operation.

12. The sensing method of claim 11, wherein the outputting of the delayed first output signal comprises:
delaying the chosen first input signal by $Z^{-1}$;
further delaying the delayed first input signal by $Z^{-1}$ to finally output the first input signal delayed by $Z^{-2}$;
delaying the first output signal corresponding to the chosen first input signal by $Z^{-1}$; and
further delaying the delayed first output signal by $Z^{-1}$ to finally output the first output signal delayed by $Z^{-2}$.

13. The sensing method of claim 10, wherein the outputting of the second filtering signal comprises:
choosing, between available input signals, the second input signal corresponding to the second filtering signal and a second filter coefficient;
delaying the chosen second input signal and a second output signal corresponding to the second input signal and outputting the delayed second input signal and the delayed second output signal; and
performing a multiplication operation on the chosen second input signal and the second filter coefficient and the delayed second input signal and the delayed second output signal, performing an addition operation on resultant signals of the multiplication operation, and outputting a result of the addition operation.

14. The sensing method of claim 13, wherein the outputting of the delayed second output signal comprises:
delaying the chosen second input signal by $Z^{-1}$;
further delaying the delayed second input signal by $Z^{-1}$ to finally output the second input signal delayed by $Z^{-2}$;
delaying the second output signal corresponding to the chosen second input signal by $Z^{-1}$; and
further delaying the delayed second output signal by $Z^{-1}$ to finally output the second output signal delayed by $Z^{-2}$.

15. The sensing method of claim 10, wherein the outputting the second input signal comprises:
shifting a frequency of the first filtering signal to a frequency lower than a frequency fs/4N through the performing of the 2N decimation operation on the first filtering signal having a frequency lower than fs/2, fs being a sampling frequency; and
outputting the first filtering signal having the shifted frequency as the second input signal.

16. The sensing method of claim 15, wherein the performing of the 2N decimation operation comprises:
performing a 2-decimation operation on the first filtering signal; and
performing an N-decimation operation on a resultant signal of the 2-decimation operation.

* * * * *